Miner Van Auken's Knitting Burr.

[54.]

No. 4,555 Reissued Sep. 12, 1871.

Witnesses.

R. Campbell
J. N. Campbell Jr.

Inventor.

M. Van Auken
by
Mason, Fenwick & Lawrence

AM. PHOTO-LITHOGRAPHIC CO. N.Y. (OSBORNE'S PROCESS.)

UNITED STATES PATENT OFFICE

MINER VAN AUKEN, OF AMSTERDAM, NEW YORK, ASSIGNOR TO JOHN WARNER, OF SAME PLACE.

IMPROVEMENT IN BURS FOR KNITTING-MACHINES.

Specification forming part of Letters Patent No. 38,997, dated June 23, 1863; antedated February 16, 1863; reissue No. 4,555, dated September 12, 1871.

*To all whom it may concern:*

Be it known that I, MINER VAN AUKEN, of Amsterdam, in the county of Montgomery and State of New York, have invented a new and useful Improvement in Knitting-Burs; and I do hereby declare that the following is a full, clear, and exact description thereof, reference being had to the accompanying drawing making part of this specification, in which—

Figure 1:
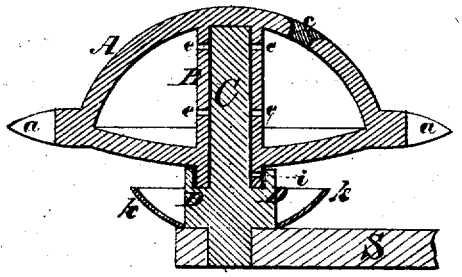
Figure 2:
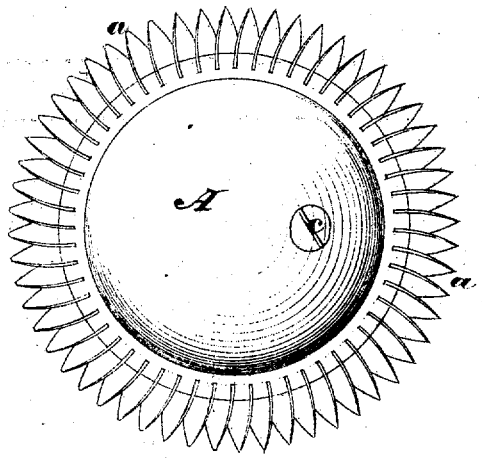

Figure 1 is a diametrical section through the bur and its support. Fig. 2 is a top view of the bur.

Similar letters of reference indicate corresponding parts in the several figures.

This invention relates to knitting-burs, which are applicable to circular-knitting machines. The object of the invention is to provide means whereby the stud of a knitting-bur may be freely lubricated, and also whereby its stud may be closed in and protected at top and bottom from dust and fibrous matter, which would clog the movement and greatly add to the friction required to be overcome in turning the burs.

The following description will enable others skilled in the art to understand my invention, the same referring to a practical mode of carrying it into effect:

In the accompanying drawing, A represents the body of the bur, into which is cast the bur-teeth *a a*. The body A is made crowning, and from its center depends a hub, B, which is intended to receive the stud C, around which the bur is turned by the action of the knitting-needles against its oblique teeth *a*. The lower end of the hub B is supported in a cup-shaped step, D, which, with the stud, C, is secured to a supporting-arm, S. K is a drip-cup, which will receive any oil that may flow from the cup-shaped step D. The drawing represents a diaphragm beneath the crowning portion of the body of the bur, which, with said crowning portion, forms a chamber for receiving oil supplied to it through an opening that is closed by a plug, *c*. The perforations *e e* and *i* through the hub B will allow oil to flow from said chamber into the hub and into a cup-shaped step to lubricate the stud C.

It will be seen, from the above description, that I construct the body of a knitting-machine bur with a closed top, so that neither dust nor any other foreign substance which may collect upon it can get into the hub B from this source; and it will also be seen that I seat the lower end of the hub B into a cup-shaped step, so that foreign substances cannot get into the hub B from below. I thus exclude dust and flying materials from both ends of the knitting-bur, and thus keep the oil which is supplied to its stud for lubricating it comparatively pure, and avoid friction by the oil not becoming gummy.

I am aware that throstles for spinning-machinery have been constructed with oil-chambers in their upper ends for preserving the oil therein free from impurities; but I do not claim a throstle for spinning-machinery.

I have improved a knitting-bur—a device which is only applicable to circular or continuous-knitting machines, and which is in no manner analogous to a spinning-throstle—by constructing it with a closed top, a depending hub, and a cup-shaped step, into which latter the lower end of said hub dips and by which it is supported upon a stud.

Previous to my invention the bodies of knitting-burs were bored entirely through to receive through them the studs about which they turned. These burs collected dust and waste and were clogged thereby, and it was necessary to remove them frequently from their studs to clean and oil them. I obviate these objections by closing the tops of the burs and extending their hubs down into cup-shaped steps.

Having described my invention, what I claim as new is—

1. A knitting-bur which is constructed with a closed top, A, and a hub, B, depending therefrom, irrespective of the oil-chamber around the hub, substantially as described.

2. A knitting-bur which combines in its construction a closed top, A, and a depending hub, B, in combination with a cup-shaped step, D, into which the lower end of the said hub extends, substantially as described.

3. The combination, in a knitting-bur, of the closed top-stock A, hub B with one or more passages through its side, and the oil-reservoir around the hub, substantially in the manner and for the purpose described.

4. A knitting-bur, the stud C of which is closed in at its top by a portion of the body of the bur and at its bottom by a cup-shaped step, D, all in such manner that the oil is closed in against the entrance into it of flying fibrous materials both at top and bottom of the bur, substantially as described.

MINER VAN AUKEN.

Witnesses:
A. A. DE FOREST,
J. A. HEATH.

(54.)